Dec. 27, 1966   G. CARNIELLI   3,294,416
FOLDING TYPE BICYCLE
Filed Jan. 6, 1965
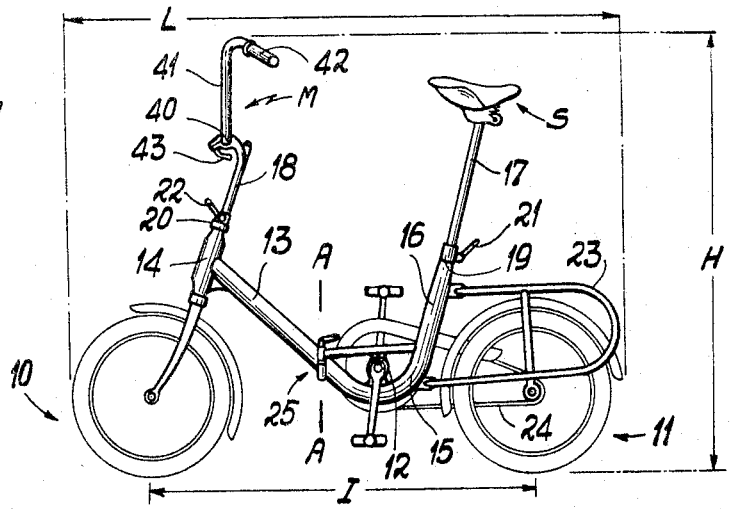
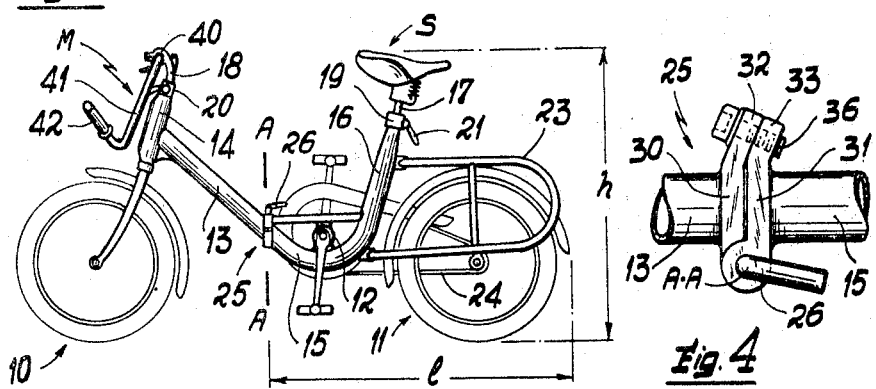
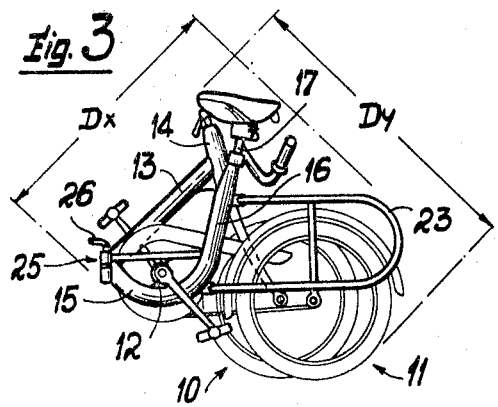
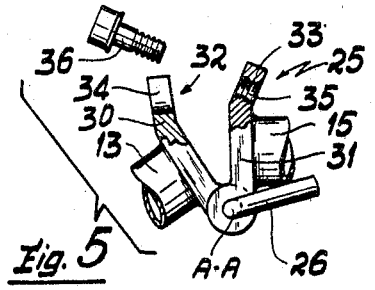
INVENTOR.
Guido Carnielli
BY
Michael J. Striker
Atty

United States Patent Office 3,294,416
Patented Dec. 27, 1966

3,294,416
FOLDING TYPE BICYCLE
Guido Carnielli, 28 Piazzale Luigi di Savoia, Milan, Italy
Filed Jan. 6, 1965, Ser. No. 424,889
Claims priority, application Italy, Jan. 7, 1964, 273/64
5 Claims. (Cl. 280—278)

This invention is concerned with a bicycle of portable folding type: more particularly, this invention relates to a new and improved portable bicycle adapted to be easily and promptly folded to reduce the size thereof within very small limits, so that the folded bicycle can be readily stored and transported into any even small sized automobile baggage compartment or carried on into railway car compartments as a conventional suitcase, and similarly readily set and arranged for use.

A principal object of this invention is to provide a new and improved small sized folding bicycle which, as compared to folding bicycles heretofore proposed, is of extremely simple and rugged construction while being relatively lightweight. Further, the bicycle of the invention is noted by its neat and pleasing appearance and by the fact that the provision of hinge and locking means adapted for folding thereof does not substantially spoil such appearance. Still further, the new bicycle of the invention is noted by the fact that it can be promptly adapted for use thereof by gentlemen, ladies and children, upon variation of the height and relative location of the saddle seat, handle-bar and pedals, according to the very cyclist's stature and corpulence. In addition, the improved bicycle of the invention is noted by fact that it includes a framework which, while being essentially rigid and capable to withstand most severe stresses and abuse, is designed to resiliently support the load urging on its saddle seat for ensuring comfortable riding thereon.

These and other objects of this invention will be apparent to those skilled in the art from the following detailed description when taken in conjunction with the accompanying drawing, forming an essential component of this disclosure, and wherein:

FIGURE 1 is a side elevation view of a preferred embodiment of the improved folding bicycle of the invention, as set for use;

FIGURE 2 is a similar side elevation of same bicycle, wherein certain components thereof have been downwardly moved to reduce the height of the bicycle;

FIGURE 3 is a similar elevation of the bicycle as in its folded state to facilitate storage and transportation thereof;

FIGURE 4 is a plan view fragmentarily and detailedly illustrating a hinge connection in the bicycle framework, as the bicycle is set for use; and FIGURE 5 is a plan view and partly a horizontal sectional sectional view of the particular component of FIG. 4, as unlocked for folding of the bicycle.

Referring first to FIGS. 1 to 3: the new bicycle comprises a front wheel 10 and a rear wheel 11 of conventional construction but of diameter noticeably lesser than the diameter of standard made bicycles tired wheels. Such relatively small diameter of wheels such as at 10 and 11 leads to provide a bicycle of advantageously relatively small overall length L while the centre-to-centre interval I nearly corresponds to those of conventionally constructed bicycles. The new bicycle, therefore, is steerable and safe to drive on as a conventional large wheeled bicycle. In addition, the location of pedals shaft at 12, relatively to the location of saddle S and of handle-bar M quite corresponds to most accepted standard for effortless and comfortable drive and riding.

The bicycle comprises a framework of tubular structure having an upwardly inclined fore component 13 welded at its fore end to a tubular member 14 wherein a conventionally constructed fork stem is rotatably arranged for steerably connecting the front wheel to framework, and a rear components including a lower middle curved portion 15 and a slightly rearwardly inclined post portion 15. The said pedals shaft 12 is rotatably supported by conventionally arranged bearings and bushing adjacently to said middle portion 15.

A tubular saddle supporting post 17 is telescopably located into said rear post portion 16 and a similarly tubular handle-bar supporting post 18 is telescopingly fitted into the fork stem in said tubular member 14. Said supporting posts 17 and 18 may be secured at the desired height by means of quick release clamps 19 and respectively 20, which may be made fast and released by means of handle levers 21 and respectively 22. Such clamp means 19–22 will be not detailedly shown and described as being of conventional construction and operation, when individually considered.

The framework is provided further with a rear frame 23 forming a rear fork structure to support the bicycle on its rear wheel 11 and whose upper horizontal bar components embody a baggage supporting structure, as it may be readily apparent from a consideration of FIGS. 1 and 2. The rear wheel 11 is drivedly connected by a conventional transmission chain 24 to the pedals.

The said handle-bar M is of substantially up-raised type, that is it includes a centre portion 40 (secured by quick release clamp means at the upper end portion of said post 18) upwardly extended side portions 41 and sidewardly protruding handles 42. Said handles 42, therefore, are located at a substantial height above the said centre portion 40, which defines a transversally located axis about which said handle-bar may be rotated upon releasing thereof from said upper end of post 18.

The new bicycle, as shown in FIG. 1, is set for use by a tall sized cyclist, as the said handle-bar and saddle supporting posts 18 and 17, respectively, are nearly fully extracted from fork stem and respectively from portion 16 of framework. Said latter components are however so dimensioned that upon properly downwardly telescoping thereinto said posts 17 and 18, the bicycle may be readily set for use of by relatively small sized gentlemen and ladies, and even by teenages. The said portion 16 is preferably inclined of 15 degrees to vertical so that the relative correct position of saddle with respect to pedals is ensured at any height of the saddle. In addition the horizontal spacing between saddle and handles 42 may be adapted to the cyclist's arms length by pivoting the handle-bar M about the axis defined by its middle portion at 40, owing to the vertical interval between 40 and 42.

In addition to the drastic reduction of height of the bicycle, from H to h (compare FIGS. 1 and 2) as a result of full insertion of tubular post 17 and 18 inside the portion 16 of framework and respectively the fork stem in part 14, and of downward rotation of handle-bar M about the axis of its centre portion at 40, the folding of the bicycle at its hinge connection at 25 leads to reduce the size of said bicycle within dimensions Dx and Dy which are substantially half of height H and respectively length L of same bicycle as set for use (compare FIGS. 1 and 3).

A preferred construction of said hinge connection at 25 is shown in FIGS. 4 and 5. Strong and thick plates 30 and 31 are rigidly connected by welding to the end portions of components 13 and respectively 15 of the framework. Said plates protrude at both sides of said components and are hingedly connected to each other at one side of said framework, by means of a pin 26 which defines the hinge axis A—A substantially spaced aside of the vertical longitudinal plane of symmetry of said framework. The opposite end portions 32 and 33 of said plates 30 and 31 are bent to form a substantial angle with the remaining parts of said plates, as shown in FIG. 4, and are provided with a fork-shaped passage 34, and respectively with a threaded bore 35 wherein a bolt 36 may be screwed-in and made fast. Owing to the angulation of parts 32 and 33, the said bolt 36 exerts its pull in a direction at an angle to the said plane of symmetry, that is with respect to the axes of adjacent portions 13 and 15 of a framework.

It has been found that the above described hinge connection, while being extremely simple both as to its construction and to its mode of operation, ensures a quite rigid and safe connection of the framework components. The said plates 30 and 31 abut on each other at slanting surfaces of their portions 32 and 33, thus ensuring a self-adjustment of the various parts, namely a transverse pull on the opposite parts pivotally connected by pin 26, thus zeroing the clearance between pin 26 and the part wherein said pin is rotatably fitted, while, as said bolt has been loosened for folding of the bicycle, said pin may freely rotate into said part.

Upon tightening of bolt 36, the framework components 13 and 15, 16 will embody a quite rigid and safe unitary structure, which is however somewhat resilient at its curve portion 15. The rear frame 23 is secured to portion 16 at two vertically spaced points, as shown in FIG. 1. Therefore the weight of the cyclist, applied to saddle S, will induce a bending stress on said portion 15. It has been found that the described construction, while being quite safe and adapted to resist to severe abuse, is capable to absorb vibrations and hard shocks upon a very slight bending of said curve portion at 15, to ensure confortable riding and prevent damages and phenomena of material fatigue.

Although the present invention has been described with respect to specific detail of one preferred embodiment thereof, it is not intended that such details be limitations upon the scope of the invention except insofar as set forth in the appended claims.

What is claimed is:

1. A portable folding type bicycle comprising a framework divided into a fore section to which a steerable assembly including a front wheel and a handle-bar is rotatably secured, a rear section to which a saddle seat, a rear wheel and pedal and transmission means to drive said rear wheel are secured, and hinge means connecting said sections, characterized in that said framework fore section comprises a first forwardly inclined straight tubular component, and the said rear section comprises a middle portion and a rear upwardly directed framing to support said rear wheel and connected to said rear portion at vertically spaced locations thereof, and in that said hinge means is located between said first component and said middle portion of said other component and includes co-abutting plate parts secured to said fore and rear section of framework, said plate parts having a hinge connection formed at a location laterially spaced from the plane of symmetry of said framework, locking means located at an opposite lateral spacing from said plane to releasably connect to each other said plate parts at their ends far from said hinge connection, and slanting abutting faces on said plate parts to induce a transverse pull on said hinge connection upon locking of said locking means.

2. The portable folding type bicycle of claim 1, wherein the said handle-bar comprise a middle portion defining a transverse axis and releasably secured for rotational adjustment about said axis to the upper end of a upwardly directed post in said steerable assembly, upwardly directed side portions and sidewardly directed handle portions at a substantial radial interval from said axis—whereby upon rotational adjustment of said handle-bar in said upper end, the horizontal spacing between said handle portions and saddle seat may be adjusted.

3. The portable folding type bicycle of claim 1, wherein said plate parts include at their said far ends a fork-shaped passage and respectively a threaded bore at an angle with respect to said plane of symmetry, said locking means consisting of a bolt passing through said passage and engaging said bore to exert a pull causing said plate parts to abut on each other on said slanting faces.

4. A portable folding type bicycle comprising a framework divided into a fore frame section carrying a front wheel and a handle-bar and a rear frame section carrying a saddle seat, a rear wheel and pedal and transmission means to drive said rear wheel; hinge means located between said fore frame section and said rear frame section hingedly securing said section to each other, said hinge means including co-abutting plate parts secured to said fore and rear frame sections, said plate parts having a hinge connection formed at a location laterally spaced from the plane of symmetry of said framework, locking means located at an opposite lateral spacing from said plane to releasably connect to each other said plate parts at their ends far from said hinge connection, and slanting abutting faces on said plate parts to induce a transverse pull on said hinge connection upon locking of said locking means.

5. A portable folding type bicycle according to claim 4, wherein said plate parts include at their said far ends a forked-shaped passage and respectively a threaded bore at an angle with respect to said plane of symmetry, said locking means consisting of a bolt passing through said passage and engaging said bore to exert a pull causing said plate parts to abut on each other on said slanting faces.

References Cited by the Examiner

UNITED STATES PATENTS

| | | | |
|---|---|---|---|
| 2,332,404 | 10/1943 | Smith | 287—99 |
| 2,705,156 | 3/1955 | Torre | 287—99 X |
| 2,777,711 | 1/1957 | Yokomaki | 280—287 |
| 2,929,641 | 3/1960 | Alvistur | 280—278 X |
| 3,091,479 | 5/1963 | Oakley | 280—281 |

FOREIGN PATENTS 1,019,111  10/1952  France.

KENNETH H. BETTS, *Primary Examiner.*